(12) United States Patent
Miller et al.

(10) Patent No.: US 10,496,593 B1
(45) Date of Patent: Dec. 3, 2019

(54) INTER-PROCESSOR COMMUNICATION AND SIGNALING SYSTEM AND METHOD

(71) Applicant: NXP USA, Inc., Austin, TX (US)

(72) Inventors: Gary L. Miller, Austin, TX (US); Jeffrey Freeman, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/995,881

(22) Filed: Jun. 1, 2018

(51) Int. Cl.
*G06F 15/17* (2006.01)
*G06F 13/42* (2006.01)
*G06F 15/78* (2006.01)
*G06F 9/38* (2018.01)

(52) U.S. Cl.
CPC ............ *G06F 15/17* (2013.01); *G06F 9/3885* (2013.01); *G06F 13/4221* (2013.01); *G06F 15/7807* (2013.01)

(58) Field of Classification Search
CPC .... G06F 9/3885; G06F 13/4221; G06F 15/17; G06F 15/7807
See application file for complete search history.

(56) References Cited

U.S. PATENT DOCUMENTS

| | | | |
|---|---|---|---|
| 5,948,089 A * | 9/1999 | Wingard | G06F 13/37 710/107 |
| 2011/0134705 A1* | 6/2011 | Jones | G06F 13/16 365/189.02 |
| 2011/0320669 A1 | 12/2011 | Scandurra et al. | |
| 2013/0089098 A1 | 4/2013 | Mital et al. | |
| 2014/0307748 A1* | 10/2014 | Wagh | G06F 13/385 370/476 |
| 2015/0249602 A1 | 9/2015 | Barner et al. | |
| 2016/0344629 A1 | 11/2016 | Gray | |

FOREIGN PATENT DOCUMENTS

| | | |
|---|---|---|
| EP | 2278757 A1 | 1/2011 |
| EP | 2330514 A1 | 6/2011 |
| GB | 2473505 A | 3/2011 |
| WO | 2017120270 A1 | 7/2017 |

OTHER PUBLICATIONS

Notice of Allowance on on U.S. Appl. No. 15/995,983, dated Oct. 17, 2019, 20 pages.

* cited by examiner

*Primary Examiner* — Eric T Oberly

(57) ABSTRACT

A system and method wherein die-to-die communication are provided between a first die and a second die contained in a common integrated circuit (IC) package, a first processor on the first die communicatively coupled to first connectivity circuitry by a first processor bus and configured to provide first bus transactions to the first processor bus, the discrete signal lines connected to the first connectivity circuitry to provide first discrete signals indicative of discrete events, the first connectivity circuitry configured to store the first discrete signals in a plurality of virtual signal registers and to convert the first bus transactions and the first discrete signals into die-to-die message packets to be communicated to the second connectivity circuitry via a die-to-die interconnect between the first die and the second die, the first discrete signals being converted into the die-to-die message packets on a register-by-register basis.

18 Claims, 4 Drawing Sheets

INTER-PROCESSOR COMMUNICATION AND SIGNALING SYSTEM AND METHOD

CROSS-REFERENCE TO RELATED APPLICATION(S)

The present application is related to co-pending U.S. patent application Ser. No. 15/995,983, entitled "INTER-PROCESSOR COMMUNICATION METHOD FOR ACCESS LATENCY BETWEEN SYSTEM-IN-PACKAGE (SIP) DIES" filed on Jun. 1, 2018, the entirety of which is herein incorporated by reference.

BACKGROUND

Field of the Disclosure

The present disclosure relates generally to electronic systems and methods and, more particularly, to electronic communication systems and methods.

Background of the Disclosure

Trends in the semiconductor industry are leading to a migration toward system-in-package (SiP) products. SiPs allow for new paradigms of optimization to solve trade-offs of leakage, performance, capability and cost. They can be used to manage scheduling and processing task complexity using a divide-and-conquer strategy.

However, SiPs also present new challenges. One of the challenges is to provide both inter-processor communication (IPC) and discrete signaling between dies via a single high-speed serial die-to-die interface, while meeting conflicting needs posed by each. Inter-processor communication (IPC) is communication between processors over an IPC bus. Discrete signaling is the communication of one or more individual signals via a respective one or more signal lines. Discrete signaling can occur between processors, such as processors on different dies.

Complications to providing a single serial interface designed to adeptly function for IPC needs and signaling between SiP die have stood in the way of advantageously meeting most SiP integration needs and providing cost advantages by the implementation of such an interface, which could allow for more than 95% of the typically needed die-to-die information to be funneled through it. Accordingly, significant challenges have heretofore existed for adequately handling both IPC and many (e.g., hundreds) of discrete signals simultaneously transported via the same serial interface.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
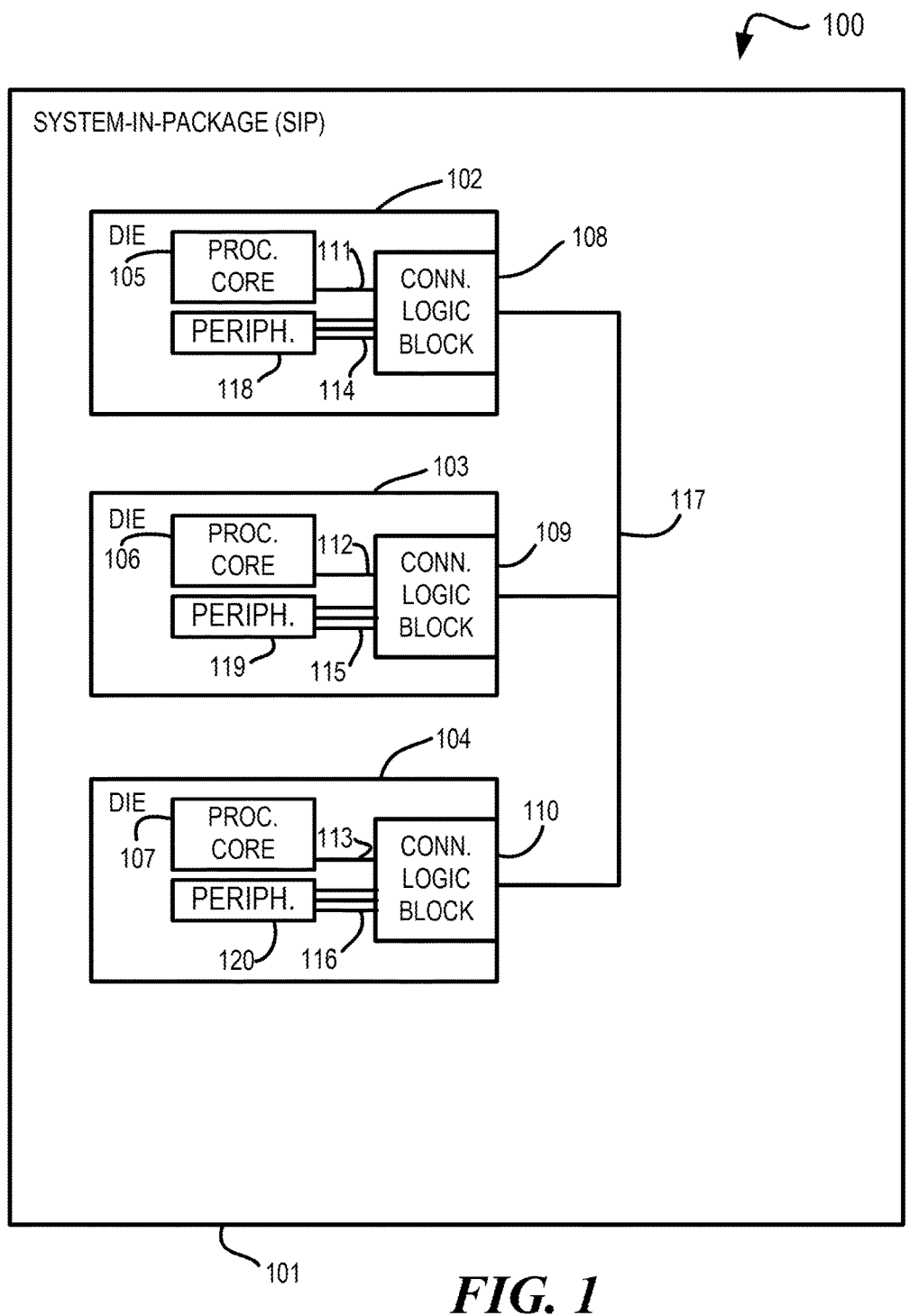
FIG. 1 is an open-package plan view of a system-in-package (SiP) system in accordance with at least one embodiment.

In accordance with at least one embodiment, an inter-processor communication and signaling system and method are provided. The system and method can convey processor bus communications and discrete signals as die-to-die message packets over a common die-to-die interconnect between a first semiconductor die and a second semiconductor die. The first semiconductor die and the second semiconductor die can be disposed within a common integrated circuit (IC) package.

A processor bus on each die is connected to corresponding connectivity logic blocks, which may be implemented, for example, by connectivity circuitry. Additionally, discrete inputs and discrete output signals on each die are connected to corresponding on-die connectivity logic blocks. The connectivity logic block on each die is interconnected to one or more other connectivity logic blocks on other die via die-to-die assembly techniques. On-die processor bus transactions as well as discrete signaling events (scalar or vector) are converted into message packets and communicated to the other die. A scalar discrete signaling event contains a single element being communicated. For instance, a single conductor conveying a single signal having a particular signaling value of a plurality of different signaling values that can be expressed by different signal amplitudes (e.g., logic levels, voltages, currents, etc.) is an example of a scalar discrete signaling event. A vector discrete signaling event contains one or more elements, arranged in parallel. For instance, two or more conductors each conveying a signal, each signal having a respective particular signaling value of a plurality of different signaling values that can be expressed by different signal amplitudes (e.g., logic levels, voltages, currents, etc.) is an example of a vector discrete signaling event. By contrast, a processor bus conveys higher bandwidth data of a general nature between processors, as opposed to the lower bandwidth particular signaling values of signals of discrete signal lines. Varying requirements of the message packets are managed using message classifications, bandwidth and latency allocation per classification, and classification-specific processing. Furthermore, discrete signaling classifications are controlled for latency, jitter, and clock domain crossing.

One practiced in the art will understand the significant challenges of adequately handling both IPC and hundreds of discrete signals simultaneously transported via the same serial interface. One example of a characteristic of IPC between dies in a SiP can include providing a virtual inter-connected bus fabric between each die, such as an advanced microprocessor bus architecture (AMBA) advanced extensible interface (AXI) bus interface, to autonomously transport transactions. Another example of a characteristic of IPC between dies in a SiP can include supporting master to slave access between die for all types of applications with fast or slow access times depending upon slave capability and with single and burst accesses of various data sizes. A further example of a characteristic of IPC between dies in a SiP can include supporting application needs for latency or bandwidth for data or instruction accesses. An example of a characteristic of discrete signaling between dies in a SiP can include conveying large numbers (e.g., hundreds) of discrete signals to be autonomously transported in each direction, which can occur at a lower frequency than IPC communications. Such discrete signals can include, for example, interrupt requests, system status, application triggers, functional safety status, etc. Another example of a characteristic of discrete signaling between dies in a SiP can include supporting clock domain crossing synchronization for scalar and vector signals, as each signal source or destination may have unique clock domains. A further example of a characteristic of IPC between dies in a SiP can include supporting signaling for a large range of types of applications, while providing low latency or low jitter.

IPC and signaling have different purposes, use models, and features to be provided to applications. The challenge is to support both IPC and signaling via a single serialized die-to-die interface despite their different characteristics, which can be difficult to reconcile.

In accordance with at least one embodiment, an IPC bus on each die is connected to an on-die die-to-die serial communication circuit. As an example, the IPC bus can be an advanced microprocessor bus architecture (AMBA) advanced extensible interface (AXI) bus. Additionally, 512 discrete input and 512 discrete output signals on each die are connected to each on-die die-to-die serial communication circuit. The on-die die-to-die serial communication circuit on each die is interconnected to one or more others via die-to-die assembly techniques. On-die IPC bus transactions as well as signaling events (scalar or vector) are converted into message packets and communicated to the other die or dies.

First, to help manage the different requirements between IPC and signaling, two message classifications are utilized: an IPC classification for all IPC bus transactions; and a signaling classification for all signaling events.

Second, to help manage bandwidth and latency requirements for both classifications, an overall quality of service (QoS) is utilized to allocate portions (e.g., percentages) to each classification. Examples of allocations the QoS feature can provide include 50% bandwidth to both IPC and signaling, 75% bandwidth to IPC and 25% bandwidth to signaling messages, 87.5% bandwidth to IPC and 12.5% bandwidth to signaling, and 100% bandwidth to IPC, wherein signaling messages can be transmitted when there is no other traffic, giving IPC precedence over any signaling messages.

Thirdly, there are dual classification-specific processing pipelines to enable predictable and customized processing as needed for IPC and signaling. A splitter is used for incoming messages to partition the messages into the correct pipeline (e.g., using the first bit of message ID). The features described below are provided to support the different characteristics. IPC pipeline processing time is quite varied, as it depends upon how fast or slow the slave is, as well as if it is a single or burst access. To assure signaling needs are met, the signaling pipeline processing time is guaranteed to be limited to a specified finite amount of time, such as one clock cycle. Thus, the timing of communication of discrete signals can be independent from factors affecting IPC latency.

Fourthly, to help provide low latency or low jitter for signaling, both of which are applicable to control system applications, a signaling QoS is configurable per signaling group. Each signaling group may be configured to assure behavior of lowest latency QoS or lowest jitter QoS.

Fifthly, to provide clock domain crossing synchronization for scalar signals, destination synchronizers may be enabled. For Gray-coded vector signals, destination synchronizers are also enabled. For qualifier-based vector signals, destination synchronizers are disabled and the lowest jitter QoS setting is utilized.

As noted above, at least one embodiment can provide technological improvement of performance of die-to-die communications. One or more features, such as the above-described multiple message classifications, per-classification QoS parameter values, multiple processing pipelines, configurability of signaling QoS signaling group, and selectable clock domain crossing synchronization based on discrete signal type can improve the ability of a die-to-die communications system to communicate both IPC bus transactions and discrete signal information in a manner conforming to the diverse needs of these different types of communications. Proper communication of both IPC bus transactions and discrete signal information can be very important to system-in-package (SiP) performance, as inadequate or delayed die-to-die communications can create a communications bottleneck or result in improper operation if important communications are not received in a timely manner. Thus, the improvements provided by the techniques described herein can make a difference between operability and inoperability or between commercial viability and non-viability.

FIG. 1 is an open-package plan view of a system-in-package (SiP) system in accordance with at least one embodiment. System 100 comprises SiP 101. SiP 101 comprises die 102, die 103, and die 104. Die 102 comprises processor core 105 and connectivity logic block 108, connectivity logic block 108 comprising connectivity circuitry. Processor core 105 is connected to connectivity logic block 108 via processor bus 111. Peripherals 118 are connected to connectivity logic block 108 via discrete signal lines 114. Die 103 comprises processor core 106 and connectivity logic block 109, connectivity logic block 109 comprising connectivity circuitry. Processor core 106 is connected to connectivity logic block 109 via processor bus 112. Peripherals 119 are connected to connectivity logic block 109 via discrete signal lines 115. Die 104 comprises processor core 107 and connectivity logic block 110. Processor core 107 is connected to connectivity logic block 110 via processor bus 113. Peripherals 120 are connected to connectivity logic block 110 via discrete signal lines 116. Connectivity logic block 108, connectivity logic block 109, and connectivity logic block 110 are connected to each other via interconnect 117.

Discrete signaling events (scalar or vector) can occur on discrete signal lines 114, 115, and 116. A scalar discrete signaling event contains a single element being communicated. For instance, a single conductor conveying a single signal having a particular signaling value of a plurality of different signaling values that can be expressed by different signal amplitudes (e.g., logic levels, voltages, currents, etc.) is an example of a scalar discrete signaling event. A vector discrete signaling event contains one or more elements, arranged in parallel. For instance, two or more conductors each conveying a signal, each signal having a respective particular signaling value of a plurality of different signaling values that can be expressed by different signal amplitudes (e.g., logic levels, voltages, currents, etc.) is an example of a vector discrete signaling event. By contrast, a processor bus conveys higher bandwidth data of a general nature between processors, as opposed to the lower bandwidth particular signaling values of signals of discrete signal lines.

Scalar discrete signaling events and vector discrete signaling events can be understood in the context of the destination domain to which signals representative of them are delivered. For a scalar discrete signaling event, a signaling event on an individual signal line is not recombined with a signaling event on another individual signal line in the destination domain. For a vector discrete signaling event, a signaling event on an individual signal line is recombined with a signaling event on another individual signal in the destination domain to recover information conveyed across the combination of the individual signal lines. For Gray-coded vector signaling events, two or more bits are recombined in the destination domain with timing issues avoided using Gray coding. Gray coding allows only one of the signal lines to change at any particular time. Gray coding can avoid temporary indeterminate states arising from temporal skew among multiple signal lines. For qualifier-based vector signaling events, two or more bits are recombined in the destination domain with timing issues avoided using a qualifier. The qualifier waits until the signals conveyed by all relevant individual signal lines have settled before determining a values of the signaling event (e.g., before latching the data into a register in the destination domain).

Figure 2:
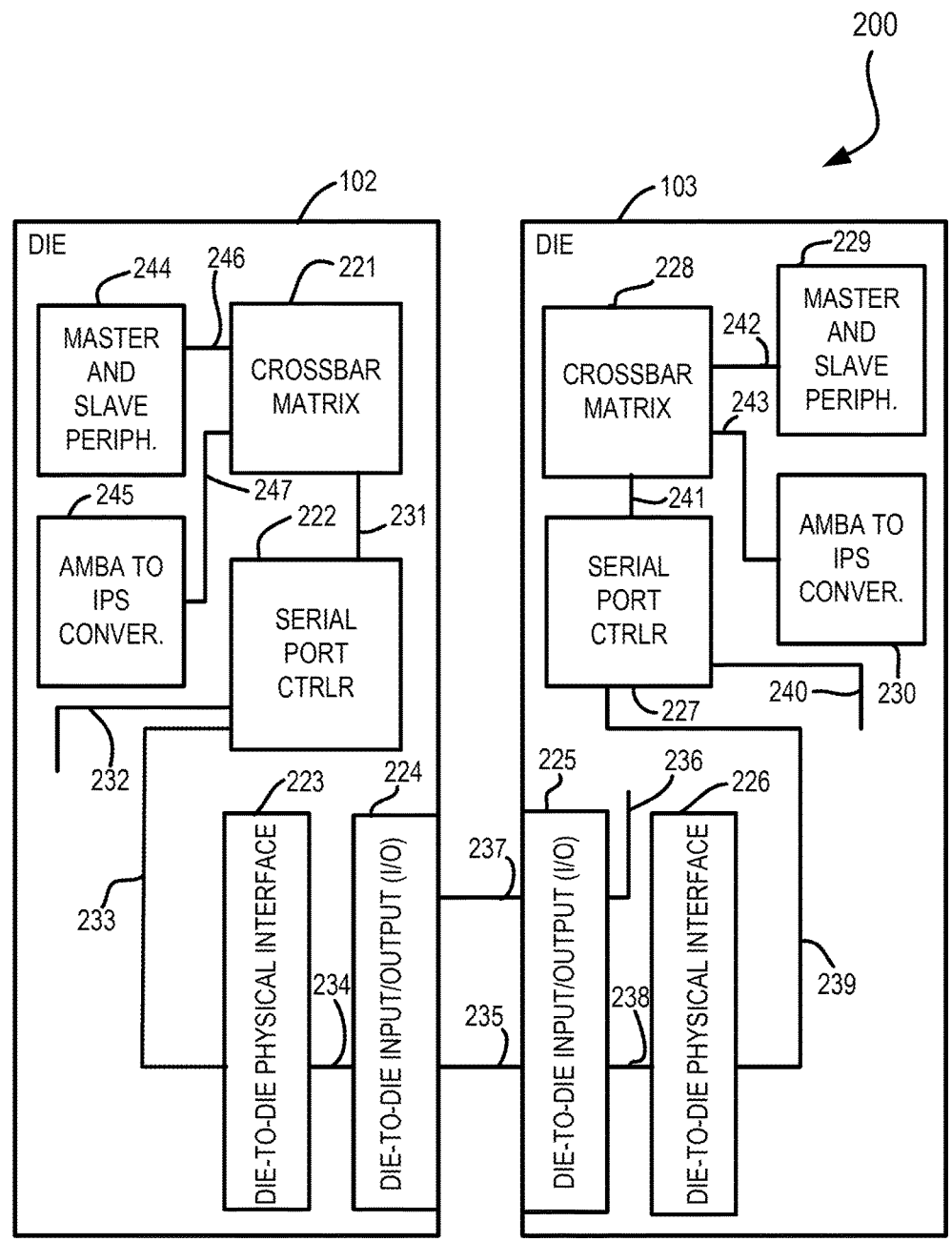
FIG. 2 is a block diagram illustrating a system in accordance with at least one embodiment.

FIG. 2 is a block diagram illustrating a system in accordance with at least one embodiment. System 200 comprises die 102 and die 103. Die 102 comprises crossbar matrix 221, serial port controller 222, die-to-die physical interface 223, and die-to-die input-output (I/O) circuit 224, as well as a processor core, such as processor core 105, and peripherals, such as peripherals 118. Die 103 comprises master and slave peripherals 229, IPC bus conversion circuit 230 (e.g., an advanced microprocessor bus architecture (AMBA) conversion circuit), crossbar matrix 228, serial port controller 227, die-to-die physical interface 226, and die-to-die input-output (I/O) circuit 225.

Crossbar matrix 221 is connected to serial port controller 222 via bus access interconnect 231. Discrete signal lines 232 are connected to serial port controller 222. Serial port controller 222 is connected to die-to-die physical interface 223 via interconnect 233. Die-to-die physical interface 223 is connected to die-to-die I/O circuit 224 via interconnect 234. Die-to-die I/O circuit 224 of die 102 is connected to die-to-die I/O circuit 225 of die 103 via die-to-die serial interconnect 235. Reference voltage Vddref 236 is connected to die-to-die I/O circuit 225. Reference voltage Vddref 237 is connected from die-to-die I/O circuit 225 to die-to-die I/O circuit 224. Die-to-die I/O circuit 225 is connected to die-to-die physical interface 226 via interconnect 238. Die-to-die physical interface is connected to serial port controller 227 via interconnect 239. Discrete signal lines 240 are connected to serial port controller 227. Serial port controller 227 is connected to crossbar matrix 228 via interconnect 241. Crossbar matrix 228 is connected to IPC bus conversion circuit 230 via interconnect 243. Crossbar matrix 228 is connected to master and slave peripherals 229 via interconnect 242.

Figure 3:
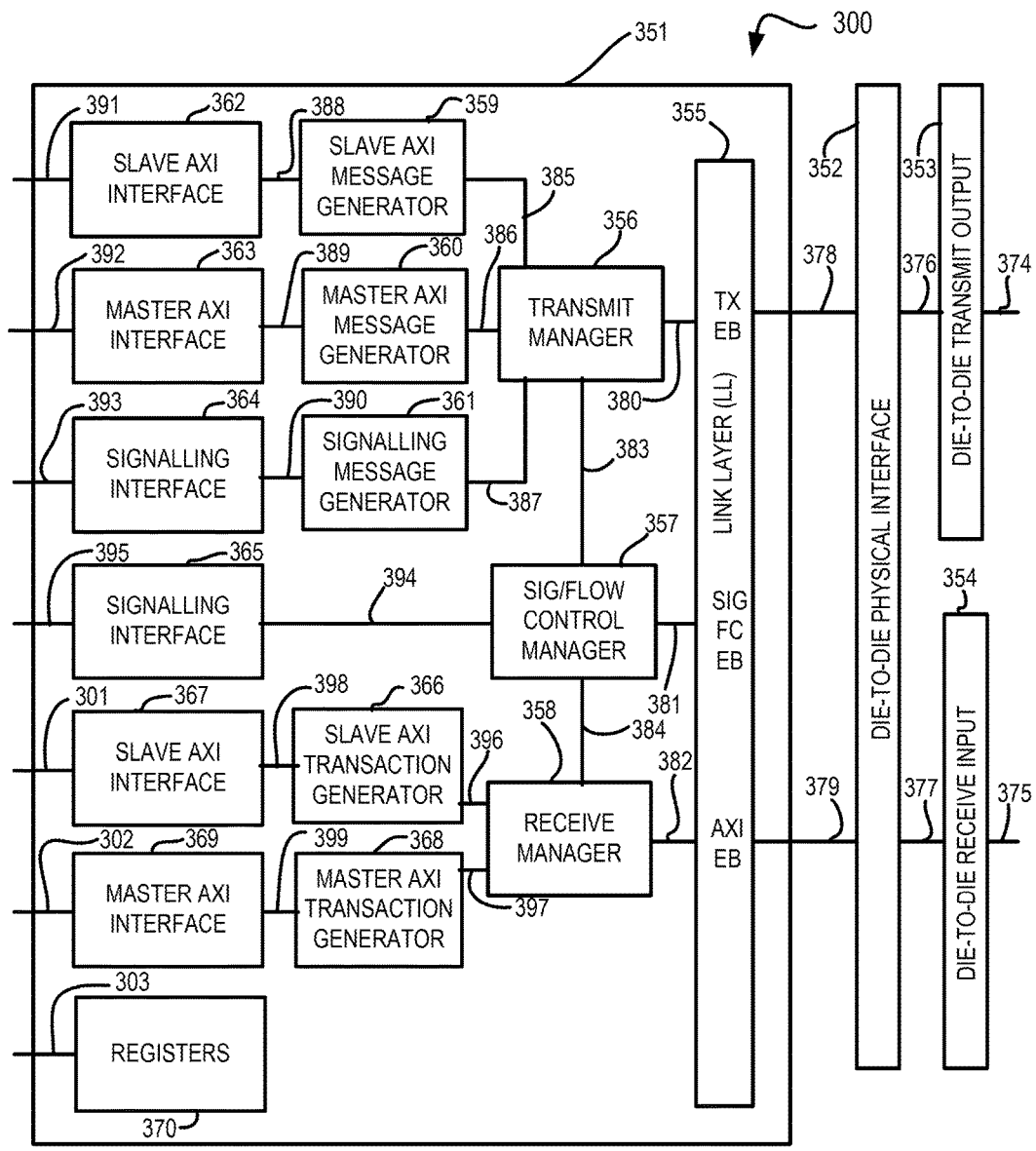
FIG. 3 is a block diagram illustrating a die implementing a system in accordance with at least one embodiment.

FIG. 3 is a block diagram illustrating a die implementing a system in accordance with at least one embodiment. Die 300 of the system comprises processing circuitry 351, die-to-die physical interface 352, die-to-die transmit output circuit 353, and die-to-die receive input circuit 354. Processing circuitry 351 comprises link layer (LL) circuit 355, transmit manager 356, signaling and flow control manager 357, receive manager 358, slave IPC bus message generator 359 (e.g., a slave advanced extensible interface (AXI) message generator), slave IPC bus circuit 362 (e.g., a slave AXI circuit), master IPC bus message generator 360 (e.g., a master AXI bus message generator), master IPC bus circuit 363 (e.g., a master AXI bus circuit), signaling message generator 361, signaling interface 364, signaling interface 365, slave IPC bus transaction generator 366 (e.g., a slave AXI transaction generator), slave IPC bus circuit 367 (e.g., a slave AXI circuit), master IPC bus transaction generator 368 (e.g., a master AXI transaction generator), master IPC bus circuit 369 (e.g., a master AXI circuit), and registers 370.

Interconnect 391 is connected to slave IPC bus circuit 362. Slave IPC bus circuit 362 is connected to slave IPC bus message generator 359 via interconnect 388. Slave IPC bus message generator 359 is connected to transmit manager 356 via interconnect 385. Interconnect 392 is connected to master IPC bus circuit 363. Master IPC bus circuit 363 is connected to master IPC bus message generator 360 via interconnect 389. Master IPC bus message generator 360 is connected to transmit manager 356 via interconnect 386. Interconnect 393 is connected to signaling interface 364. Signaling interface 364 is connected to signaling message generator 361 via interconnect 390. Signaling message generator 361 is connected to transmit manager 356 via interconnect 387. Transmit manager 356 is connected to link layer circuit 355 via interconnect 380. Link layer circuit 355 of processing circuitry 351 is connected to die-to-die physical interface 352 via interconnect 378. Die-to-die physical interface 352 is connected to die-to-die transmit I/O circuit 353 via interconnect 376. Die-to-die transmit I/O circuit 353 is connected to interconnect 374.

Transmit manager 356 is connected to signaling and flow control manager 357 via interconnect 383. Signaling and flow control manager 357 is connected to signaling interface 365 via interconnect 394. Signaling interface 365 is connected to interconnect 395. Signaling and flow control manager 357 is connected to receive manager 358 via interconnect 384. Signaling and flow control manager 357 is connected to link layer circuit 355 via interconnect 381.

Interconnect 375 is connected to die-to-die receive I/O circuit 354. Die-to-die receive I/O circuit 354 is connected to die-to-die physical interface 352 via interconnect 377. Die-to-die physical interface 352 is connected to link layer circuit 355 of processing circuitry 351 via interconnect 379. Link layer circuit 355 is connected to receive manager 358 via interconnect 382. Receive manager 358 is connected to slave IPC bus transaction generator 366 via interconnect 396. Slave IPC bus transaction generator 366 is connected to slave IPC bus circuit 367 via interconnect 398. Interconnect 301 is connected to slave IPC bus circuit 367. Receive manager 358 is connected to master IPC bus transaction generator 368 via interconnect 397. Master IPC transaction generator 368 is connected to master IPC circuit 369 via interconnect 399. Interconnect 302 is connected to master IPC circuit 369.

While both slave and master components are illustrated in processing circuitry 351, a master device can be implemented without the slave components, a slave device can be implemented without the master components, or a selectable master and slave device can be implemented as illustrated. Link layer circuit 355 comprises elastic buffers to support communications. For example, link layer circuit 355 is shown as comprising a transmit elastic buffer (TX EB), a receive elastic buffer (AXI EB or RX EB), and a signaling and flow control elastic buffer (SIG FC EB).

Figure 4:
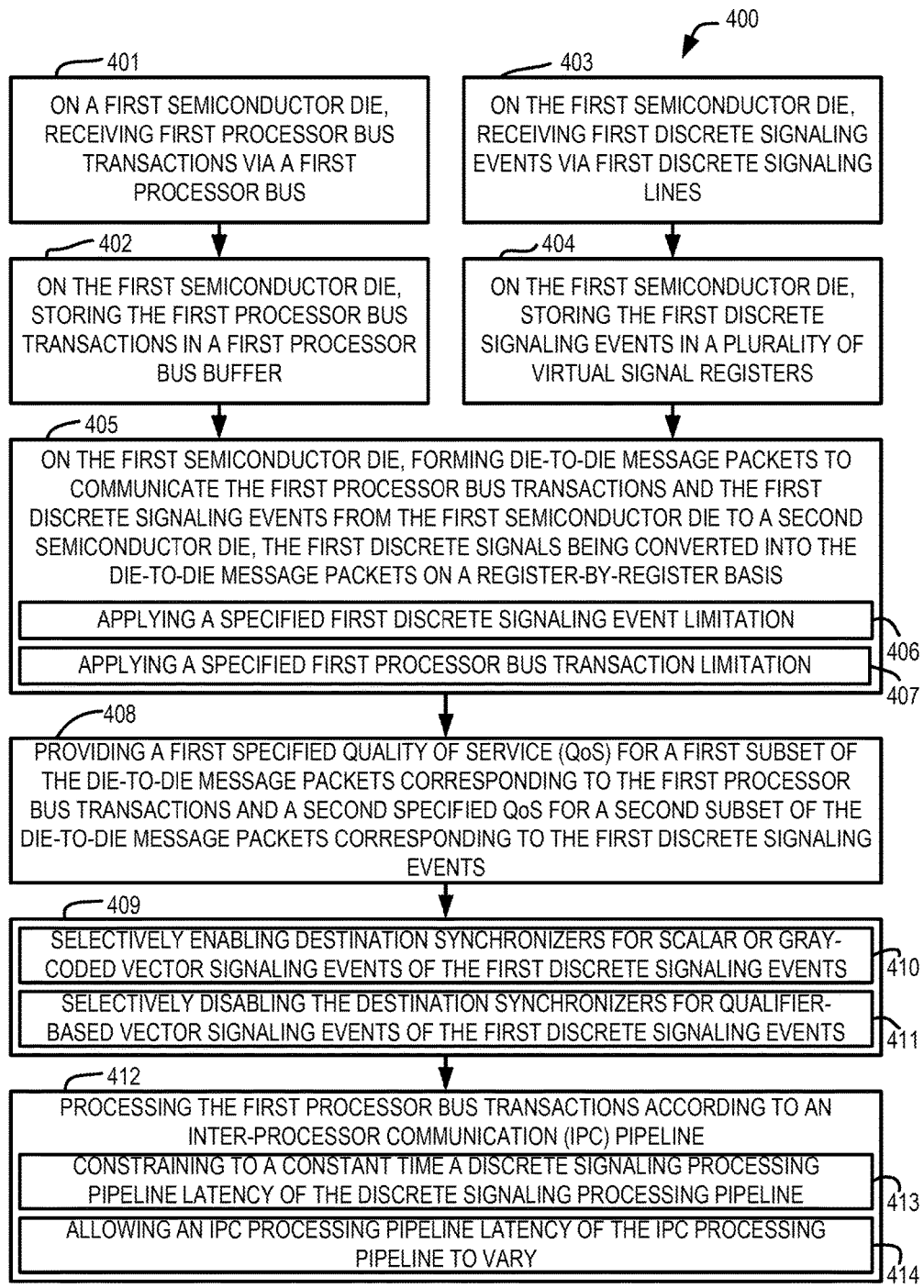
FIG. 4 is a flow diagram illustrating a method in accordance with at least one embodiment.

FIG. 4 is a flow diagram illustrating a method in accordance with at least one embodiment. Method 400 begins and proceeds to blocks 401 and 403. At block 401, on a first semiconductor die, first processor bus transactions are received via a first processor bus. At block 403, on the first semiconductor die, first discrete signaling events are received via discrete signaling lines. From block 401, method 400 continues to block 402. From block 403, method 400 continues to block 404. At block 402, on the first semiconductor die, the first processor bus transactions are stored in a first processor bus buffer. At block 404, on the first semiconductor die, the first discrete signaling events are stored in a plurality of virtual signal registers.

From block 402, method 400 continues to block 405. From block 404, method 400 continues to block 405. At block 405, on the first semiconductor die, die-to-die message packets are formed to communicate the first processor bus transactions and the first discrete signaling events from the first semiconductor die to a second semiconductor die. The first discrete signals are converted into the die-to-die message packets on a register-by-register basis. In accordance with at least one embodiment, block 404 comprises block 406, block 407, or both. At block 406, a specified first discrete signaling event limitation is applied. The specified first discrete signaling event limitation can be applied to constrain an amount of the first discrete signaling events communicated via the die-to-die message packets. At block 407, a specified first processor bus transaction limitation is applied. The specified first processor bus transaction limitation can be applied to constrain an amount of the first processor bus transactions communicated via the die-to-die message packets.

From block 405, method 400 continues to block 408. At block 408, a first specified quality of service (QoS) is provided for a first subset of the die-to-die message packets corresponding to the first processor bus transactions, and a second specified QoS is provided for a second subset of the die-to-die message packets corresponding to the first discrete signaling events. From block 408, method 400 continues at block 409. In accordance with at least one embodiment, block 409 can comprise block 410, block 411, or both. At block 410, destination synchronizers on the second semiconductor die are selectively enabled for scalar or Gray-coded vector signaling events of the first discrete signaling events. At block 411, the destinations synchronizers on the second semiconductor die are selectively disabled for qualifier-based vector signaling events of the first discrete signaling events.

From block 409, method 400 continues to block 412. At block 412, the first processor bus transactions are processed according to an inter-processor communication (IPC) pipeline. In accordance with at least one embodiment, block 412 can comprise block 413, block 404, or both. At block 413, a discrete signaling processing pipeline latency is constrained to a constant time. At block 414, an IPC processing pipeline latency of the IPC processing pipeline is allowed to vary.

In accordance with at least one embodiment, a system comprises a first semiconductor die having a first processor, first connectivity circuitry, a first processor bus, and discrete signal lines. The system also comprises a second semiconductor die having second connectivity circuitry, the first die and the second die contained in a common integrated circuit (IC) package. The first processor is communicatively coupled to the first connectivity circuitry by the first processor bus and configured to provide first bus transactions, to be provided to the second connectivity circuitry, to the first processor bus. The discrete signal lines are connected to the first connectivity circuitry to provide first discrete signals indicative of discrete events. The first connectivity circuitry is configured to store the first discrete signals in a plurality of virtual signal registers and to convert the first bus transactions and the first discrete signals into die-to-die message packets to be communicated to the second connectivity circuitry via a die-to-die interconnect between the first die and the second die, the first discrete signals being converted into the die-to-die message packets on a register-by-register basis.

In accordance with at least one embodiment, an amount of the first discrete signaling events communicated via the die-to-die message packets is constrained to a specified first discrete signaling event limitation. In accordance with at least one embodiment, an amount of the first processor bus transactions communicated via the die-to-die message packets is constrained to a specified first processor bus transaction limitation. In accordance with at least one embodiment, the first connectivity circuitry comprises dual classification-specific processing pipelines, the dual classification-specific processing pipelines comprising an inter-processor communication (IPC) processing pipeline and a discrete signaling processing pipeline. In accordance with at least one embodiment, a discrete signaling processing pipeline latency of the discrete signaling processing pipeline is constrained to a constant time while a IPC processing pipeline latency of the IPC processing pipeline is allowed to vary. In accordance with at least one embodiment, the system provides a first specified quality of service (QoS) for a first subset of the die-to-die message packets corresponding to the first processor bus transactions and a second specified QoS for a second subset of the die-to-die message packets corresponding to the first discrete signaling events. In accordance with at least one embodiment, the system further comprises destination synchronizers, the destination synchronizers selectively enabled for scalar or Gray-coded vector signaling events of the first discrete signaling events and selectively disabled for qualifier-based vector signaling events of the first discrete signaling events.

In accordance with at least one embodiment, a method comprises, on a first semiconductor die, receiving first processor bus transactions via a first processor bus; on the first semiconductor die, receiving first discrete signaling events via first discrete signaling lines; on the first semiconductor die, storing the first discrete signaling events in a plurality of virtual signal registers; and, on the first semiconductor die, forming die-to-die message packets to communicate the first processor bus transactions and the first discrete signaling events from the first semiconductor die to a second semiconductor die, the first discrete signals being converted into the die-to-die message packets on a register-by-register basis, the first semiconductor die and the second semiconductor die contained in a common integrated circuit (IC) package.

In accordance with at least one embodiment, the method further comprises applying a specified first discrete signaling event limitation to constrain an amount of the first discrete signaling event communicated via the die-to-die message packets. In accordance with at least one embodiment, the method further comprises applying a specified first processor bus transaction limitation to constrain an amount of the first processor bus transactions communicated via the die-to-die message packets. In accordance with at least one embodiment, the method further comprises processing the first processor bus transactions according to an inter-processor communication (IPC) pipeline; and processing the first discrete signaling events according to a discrete signaling processing pipeline. In accordance with at least one embodiment, the method further comprises constraining to a constant time a discrete signaling processing pipeline latency of the discrete signaling processing pipeline; and allowing an IPC processing pipeline latency of the IPC processing pipeline to vary. In accordance with at least one embodiment, the method further comprises providing a first specified quality of service (QoS) for a first subset of the die-to-die message packets corresponding to the first processor bus transactions and a second specified QoS for a second subset of the die-to-die message packets corresponding to the first discrete signaling events. In accordance with at least one embodiment, the method further comprises selectively enabling destination synchronizers for scalar or Gray-coded scalar signaling events of the first discrete signaling events; and selectively disabling the destination synchronizers for qualifier-based vector signaling events of the first discrete signaling events.

In accordance with at least one embodiment, an apparatus comprises a common integrated circuit (IC) package; a first processor on a first semiconductor die, the first semiconductor die contained in the common IC package; a second processor on a second semiconductor die, the second semiconductor die contained in the common IC package; first connectivity circuitry on the first semiconductor die, the first connectivity circuitry connected to the first processor via a first processor bus, the first connectivity circuitry further connected to a first set of discrete signal lines, the first connectivity circuitry configured to store the first discrete signals in a plurality of virtual signal registers and to convert first processor bus transactions on the first processor bus and first discrete signaling events on the first set of discrete signal lines into die-to-die message packets for communication via a die-to-die interconnect, the first discrete signals being converted into the die-to-die message packets on a register-by-register basis; and a second connectivity circuitry on the second semiconductor die, the second connectivity circuitry connected to the die-to-die interconnect for receiving the die-to-die message packets, the second connectivity circuitry connected to the second processor via a second processor bus, the second connectivity circuitry further connected to a second set of discrete signal lines, the second connectivity circuitry configured to convert the die-to-die message packets into second processor bus transactions on the second processor bus and second discrete signaling events on the second set of discrete signal lines. In accordance with at least one embodiment, an amount of first discrete signaling events communicated via die-to-die message packets is constrained to a specified first discrete signaling event limitation. In accordance with at least one embodiment, an amount of the first processor bus transactions communicated via the die-to-die message packets is constrained to a specified first processor bus transaction limitation. In accordance with at least one embodiment, the apparatus comprises dual classification-specific processing pipelines comprising an inter-processor communication (IPC) processing pipeline and a discrete signaling processing pipeline. In accordance with at least one embodiment, a discrete signaling processing pipeline latency of the discrete signaling processing pipeline is constrained to a constant time while an IPC processing pipeline latency of the IPC processing pipeline is allowed to vary. In accordance with at least one embodiment, the apparatus provides a first specified quality of service (QoS) for a first subset of the die-to-die message packets corresponding to the first processor bus transactions and a second specified QoS for a second subset of the die-to-die message packets corresponding to the first discrete signaling events.

The preceding description in combination with the Figures was provided to assist in understanding the teachings disclosed herein. The discussion focused on specific implementations and embodiments of the teachings. This focus was provided to assist in describing the teachings, and should not be interpreted as a limitation on the scope or applicability of the teachings. However, other teachings can certainly be used in this application. The teachings can also be used in other applications, and with several different types of architectures.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The terms "substantially," "about," and their variants, as used herein are intended to refer to the qualified article being sufficient to achieve the stated purpose or value in a practical manner, which includes taking into account any minor imperfections or deviations, if any, that arise from usual and expected abnormalities that may occur during device operation, which are not significant for the stated purpose or value. In addition, the term "substantially" has further been defined herein in the context of specific attributes to identify specific ranges.

What is claimed is:

1. A system comprising:
a first semiconductor die having a first processor, first connectivity circuitry, a first processor bus, and discrete signal lines; and
a second semiconductor die having second connectivity circuitry, the first die and the second die contained in a common integrated circuit (IC) package;

the first processor communicatively coupled to the first connectivity circuitry by the first processor bus and configured to provide first bus transactions, to be provided to the second connectivity circuitry, to the first processor bus;

the discrete signal lines connected to the first connectivity circuitry to provide first discrete signals indicative of discrete events;

the first connectivity circuitry configured to store the first discrete signals in a plurality of virtual signal registers and to convert the first bus transactions and the first discrete signals into die-to-die message packets to be communicated to the second connectivity circuitry via a die-to-die interconnect between the first die and the second die, the first discrete signals being converted into the die-to-die message packets on a register-by-register basis;

destination synchronizers, the destination synchronizers selectively enabled for scalar or Gray-coded vector signaling events of the first discrete signaling events and selectively disabled for qualifier-based vector signaling events of the first discrete signaling events.

2. The system of claim 1 wherein an amount of the first discrete signaling events communicated via the die-to-die message packets is constrained to a specified first discrete signaling event limitation.

3. The system of claim 1 wherein an amount of the first processor bus transactions communicated via the die-to-die message packets is constrained to a specified first processor bus transaction limitation.

4. The system of claim 1 wherein the first connectivity circuitry comprises dual classification-specific processing pipelines, the dual classification-specific processing pipelines comprising an inter-processor communication (IPC) processing pipeline and a discrete signaling processing pipeline.

5. The system of claim 4 wherein a discrete signaling processing pipeline latency of the discrete signaling processing pipeline is constrained to a constant time while a IPC processing pipeline latency of the IPC processing pipeline is allowed to vary.

6. The system of claim 1 wherein the system provides a first specified quality of service (QoS) for a first subset of the die-to-die message packets corresponding to the first processor bus transactions and a second specified QoS for a second subset of the die-to-die message packets corresponding to the first discrete signaling events.

7. A method comprising:
on a first semiconductor die, receiving first processor bus transactions via a first processor bus;
on the first semiconductor die, receiving first discrete signaling events via first discrete signaling lines;
on the first semiconductor die, storing the first discrete signaling events in a plurality of virtual signal registers; and
on the first semiconductor die, forming die-to-die message packets to communicate the first processor bus transactions and the first discrete signaling events from the first semiconductor die to a second semiconductor die, the first discrete signals being converted into the die-to-die message packets on a register-by-register basis, the first semiconductor die and the second semiconductor die contained in a common integrated circuit (IC) package;
selectively enabling destination synchronizers for scalar or Gray-coded scalar signaling events of the first discrete signaling events; and selectively disabling the destination synchronizers for qualifier-based vector signaling events of the first discrete signaling events.

8. The method of claim 7 further comprising:
applying a specified first discrete signaling event limitation to constrain an amount of the first discrete signaling event communicated via the die-to-die message packets.

9. The method of claim 7 further comprising:
applying a specified first processor bus transaction limitation to constrain an amount of the first processor bus transactions communicated via the die-to-die message packets.

10. The method of claim 7 further comprising:
processing the first processor bus transactions according to an inter-processor communication (IPC) pipeline; and
processing the first discrete signaling events according to a discrete signaling processing pipeline.

11. The method of claim 10 further comprising:
constraining to a constant time a discrete signaling processing pipeline latency of the discrete signaling processing pipeline; and
allowing an IPC processing pipeline latency of the IPC processing pipeline to vary.

12. The method of claim 7 further comprising:
providing a first specified quality of service (QoS) for a first subset of the die-to-die message packets corresponding to the first processor bus transactions and a second specified QoS for a second subset of the die-to-die message packets corresponding to the first discrete signaling events.

13. Apparatus comprising:
a common integrated circuit (IC) package;
a first processor on a first semiconductor die, the first semiconductor die contained in the common IC package;
a second processor on a second semiconductor die, the second semiconductor die contained in the common IC package;
first connectivity circuitry on the first semiconductor die, the first connectivity circuitry connected to the first processor via a first processor bus, the first connectivity circuitry further connected to a first set of discrete signal lines, the first connectivity circuitry configured to store the first discrete signals in a plurality of virtual signal registers and to convert first processor bus transactions on the first processor bus and first discrete signaling events on the first set of discrete signal lines into die-to-die message packets for communication via a die-to-die interconnect, the first discrete signals being converted into the die-to-die message packets on a register-by-register basis;
a second connectivity circuitry on the second semiconductor die, the second connectivity circuitry connected to the die-to-die interconnect for receiving the die-to-die message packets, the second connectivity circuitry connected to the second processor via a second processor bus, the second connectivity circuitry further connected to a second set of discrete signal lines, the second connectivity circuitry configured to convert the die-to-die message packets into second processor bus transactions on the second processor bus and second discrete signaling events on the second set of discrete signal lines; and destination synchronizers, the destination synchronizers selectively enabled for scalar or Gray-coded vector signaling events of the first discrete signaling events.

14. The apparatus of claim 13 wherein an amount of first discrete signaling events communicated via die-to-die message packets is constrained to a specified first discrete signaling event limitation.

15. The apparatus of claim 13 wherein an amount of the first processor bus transactions communicated via the die-to-die message packets is constrained to a specified first processor bus transaction limitation.

16. The apparatus of claim 13 comprising dual classification-specific processing pipelines comprising an inter-processor communication (IPC) processing pipeline and a discrete signaling processing pipeline.

17. The apparatus of claim 13 wherein a discrete signaling processing pipeline latency of the discrete signaling processing pipeline is constrained to a constant time while an IPC processing pipeline latency of the IPC processing pipeline is allowed to vary.

18. The apparatus of claim 13 wherein the apparatus provides a first specified quality of service (QoS) for a first subset of the die-to-die message packets corresponding to the first processor bus transactions and a second specified QoS for a second subset of the die-to-die message packets corresponding to the first discrete signaling events.

* * * * *